No. 888,820. PATENTED MAY 26, 1908.
I. L. KINDIG.
SELF SETTING TRAP.
APPLICATION FILED APR. 6, 1908.
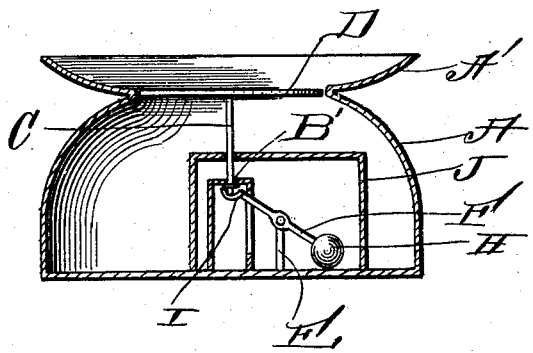
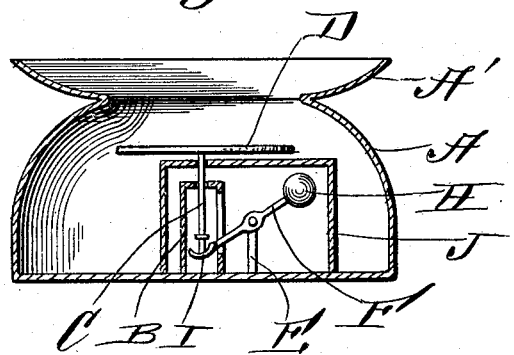

UNITED STATES PATENT OFFICE.

IVA L. KINDIG, OF SECOR, ILLINOIS.

SELF-SETTING TRAP.

No. 888,820.　　　　Specification of Letters Patent.　　　　Patented May 26, 1908.

Application filed April 6, 1908. Serial No. 425,457.

*To all whom it may concern:*

Be it known that I, IVA L. KINDIG, a citizen of the United States, residing at Secor, in the county of Woodford and State of Illinois, have invented certain new and useful Improvements in Self-Setting Traps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in self-setting traps and comprises various details of construction, combinations and arrangements of parts which will be hereinafter fully described and then specifically defined in the appended claims.

My invention is illustrated in the accompanying drawings, in which:—

Figure 1 is a sectional view through the trap, showing the same set, and Fig. 2 is a similar view showing the trap sprung or with the movable platform at its lowest limit.

Reference now being had to the details of the drawings by letter, A designates a receptacle which may be of any desired shape or size and provided with a flange A' about its upper end. Mounted within said receptacle is a hollow post B having an aperture B' in its upper end, and C designates a rod movably mounted in said post and passing through the aperture in the top thereof. On the upper end of said rod is a platform D which is of a size designed to fit the constricted portion of the receptacle at the point of merger of the flange with the body portion thereof.

E is a rod rising from the bottom of the receptacle and upon which a tilting lever F is pivotally mounted, said lever having a weight H at one end and its other end I scalloped or cup shaped and in which the lower end of the rod C normally rests. Said weight is slightly greater in weight than the platform and rod, thereby normally holding the platform in the position shown in Fig. 1 of the drawings, in which position the trap is set. A boxing J fits over said post and the pivotal lever F and through the top in which boxing the rod C has a play. By the provision of said boxing, the operative parts therein may be protected.

The operation of my invention will be readily understood and is as follows:—The platform is normally held in its highest position by the weighted lever and, when the weight of an animal bears upon the platform, will cause the latter to tilt down, thus precipitating the animal within the receptacle and, after the weight of the animal is relieved from the platform, the weight upon the lever F will return the platform to its normal position thereby producing a self-setting and everset trap.

What I claim to be new is:—

1. A self-setting trap comprising a receptacle having a constricted portion above which the receptacle is outwardly flanged, a hollow post mounted within the receptacle, a vertically movable rod mounted within said post, a platform secured to said rod, a weighted tilting lever adapted to normally hold said rod and platform at their highest limit with the platform opposite said constricted portion of the receptacle, as set forth.

2. A self-setting trap comprising a receptacle having a constricted portion above which the receptacle is outwardly flanged, a hollow post mounted within the receptacle, a vertically movable rod mounted within said post, a platform secured to said rod, a pin rising from the bottom of the receptacle, a lever pivotally mounted upon said pin, one end of said lever being cupped and adapted to receive the lower end of said rod, and a weight upon said lever, as set forth.

3. A self-setting trap comprising a receptacle having a constricted portion above which the receptacle is outwardly flanged, a hollow post mounted within the receptacle, a vertically movable rod mounted within said post, a platform secured to said rod, a pin rising from the bottom of the receptacle, a lever pivotally mounted upon said pin, one end of said lever being cupped and adapted to receive the lower end of said rod, a weight upon said lever, a boxing over said lever and post and apertured to receive said rod, as set forth.

In testimony whereof I hereunto affix my signature in the presence of two witnesses.

IVA L. KINDIG.

Witnesses:
　JOSEPH ZEIGER,
　E. C. LUDWIG.